(12) United States Patent
Yun

(10) Patent No.: US 9,056,579 B2
(45) Date of Patent: Jun. 16, 2015

(54) HEADLAMP DEVICE FOR TWO-WHEELED MOTOR VEHICLE

(75) Inventor: Jiang Yun, Songjiang Shanghai (CN)

(73) Assignee: Honda Motor Co., Ltd., Tokyo (JP)

( * ) Notice: Subject to any disclaimer, the term of this patent is extended or adjusted under 35 U.S.C. 154(b) by 1076 days.

(21) Appl. No.: 13/102,235

(22) Filed: May 6, 2011

(65) Prior Publication Data

US 2011/0273896 A1    Nov. 10, 2011

(30) Foreign Application Priority Data

May 7, 2010    (CN) .......................... 2010 1 0172586

(51) Int. Cl.
*B62J 6/00*    (2006.01)
*B60Q 1/00*    (2006.01)
*B62J 6/02*    (2006.01)

(52) U.S. Cl.
CPC ............... *B60Q 1/0047* (2013.01); *B62J 6/005* (2013.01); *B62J 6/02* (2013.01)

(58) Field of Classification Search
CPC ....... B62J 6/02; B60Q 1/2661; B60Q 1/0408; B60Q 1/0416; B60Q 1/0433; B60Q 1/0029; F21S 48/1109; B62K 11/12
USPC ........................................................... 362/476
See application file for complete search history.

(56) References Cited

U.S. PATENT DOCUMENTS

| 6,158,279 A * | 12/2000 | Saiki ................................. 73/493 |
| 6,951,417 B2 | 10/2005 | Ito et al. |
| 2004/0109325 A1* | 6/2004 | Ito et al. ........................ 362/547 |

FOREIGN PATENT DOCUMENTS

| CN | 101468677 A | 7/2009 |
| EP | 2 052 909 A2 | 4/2009 |
| JP | 2004-082851 A | 3/2004 |

* cited by examiner

*Primary Examiner* — Mary McManmon
(74) *Attorney, Agent, or Firm* — Carrier Blackman & Associates, P.C.; Joseph P. Carrier; William D. Blackman

(57) ABSTRACT

A headlamp device includes a mounting stay extending from a vehicle body, a headlamp case mounted to the mounting stay in such a manner as to enclose the mounting stay, and a lamp unit mounted to the headlamp case.

10 Claims, 5 Drawing Sheets

HEADLAMP DEVICE FOR TWO-WHEELED MOTOR VEHICLE

FIELD OF THE INVENTION

The present invention relates to a headlamp device for a two-wheeled motor vehicle.

BACKGROUND OF THE INVENTION

A headlamp device for lighting a forward area of a two-wheeled motor vehicle or a motorcycle is disposed at a distinguishable part in a front part of a vehicle body. Since it is a part that can be viewed from outside, a headlamp device is required to have an aesthetic aspect or aestheticity. A headlamp device with improved aestheticity as applied to a motorcycle is disclosed in, e.g., Japanese Patent Application Laid-Open Publication No. 2004-82851 (JP-A 2004-82851).

In the motorcycle disclosed in JP-A 2004-82851, a headlamp stay extends forward from a front suspension of the motorcycle. A lower headlamp case is attached to the headlamp stay. A lamp unit is inserted into the lower headlamp case from above and secured to the headlamp stay. Then, an upper headlamp case is laid on the lower headlamp case with the lamp unit enclosed therein. Since the headlamp stay is enclosed by the upper and lower headlamp cases, a resultant headlamp device has improved external looks.

However, since the headlamp case is comprised of two parts, namely, the upper headlamp case and the lower headlamp case, the headlamp device has an increased number of parts, rendering the device complex in construction.

Moreover, an operation to mount the headlamp device to the motorcycle body comprises three steps, namely, the lower headlamp case mounting step, the lamp unit mounting step, and the upper headlamp case mounting step. Since the three steps are required to mount the headlamp device to the motorcycle body, the headlamp device mounting operation is tedious and complex.

SUMMARY OF THE INVENTION

It is therefore an object of the present invention to provide a headlamp device which is simple in construction and mounting operation.

According to the present invention, there is provided a headlamp device adapted to be attached to a front part of a body of a two-wheeled motor vehicle, which device comprises: a mounting stay extending forward from a front part of the vehicle body; a headlamp case having a hole for allowing insertion of the mounting stay, and a front opening formed at a front part thereof; a connecting element for connecting the headlamp case to the mounting stay; and a lamp unit mounted to a front part of the headlamp case in such a manner as to cover the front opening and having a light emitting element.

The headlamp case is a non-divided part and hence is free of concerns about an increase in parts. The non-divided headlamp case is less complex in construction than a divided-type headlamp case An operation to mount the headlamp device to the vehicle body is completed by only two steps, namely, the step of attaching the headlamp case to the mounting stay and the step of attaching the lamp unit to the headlamp case.

Preferably, the hole is formed at a lower part of the headlamp case. Even when a foreign object entered into the headlamp device 45, it may be discharged downward through the hole. One may be freed from fear that the inside of the headlamp device will be dirtied.

It is desirable that the mounting stay have a pair of left and right vertical wall parts spaced from each other laterally of the vehicle body, and the vertical wall parts have through-holes for allowing passage of the connecting element. Selected to serve as connecting portions are the vertical wall parts which are spaced from each other in the vehicle widthwise direction. By virtue of the lateral spacing of the vertical wall parts, the mounting stay becomes lighter by the amount corresponding to the spacing formed between the vertical wall parts.

In a desired form, the left and right vertical wall parts are arranged to provide a gap therebetween for accommodating a harness that is provided to feed electrical power to the light emitting element. The gap is utilized as a passage of the harness. Swinging of the harness in the vehicle widthwise direction can be prevented by the vertical wall parts.

It is desirable that the headlamp device be in the form of a bowl. By virtue of being bowl-shaped, it becomes possible for the headlamp case to have the front opening which is large in diameter and to have a good external appearance.

It is preferred that the mounting stay comprise a stay front half member having the vertical wall parts, and a stay rear half member for connecting the stay front half member to a front part of the vehicle body. Both the stay front half member and the stay rear half member may be provided in several different kinds. As a result, it becomes possible to mate a desired one of the provided stay front half members and a desired one of the provided stay rear half members. With the stay front half member and the stay rear half member provided in pluralism, it becomes possible to select desired ones of the provided stay front and rear half members for coupling with one selected from among plural headlamp cases that are also made available for use.

In a desired form, the stay rear half member has a direction indicator supporting part for supporting a direction indicator. By virtue of the stay rear half member used also to support the direction indicator, a dedicated direction indicator supporting stay may be omitted.

BRIEF DESCRIPTION OF THE DRAWINGS

A preferred embodiment of the present invention will be described below, by way of example only, with reference to the accompanying drawings, in which.

DETAILED DESCRIPTION OF THE PREFERRED EMBODIMENT

Throughout this specification, the terms "right" and "left" represent directions as viewed from a driver seated in a seat 10.

Figure 1:
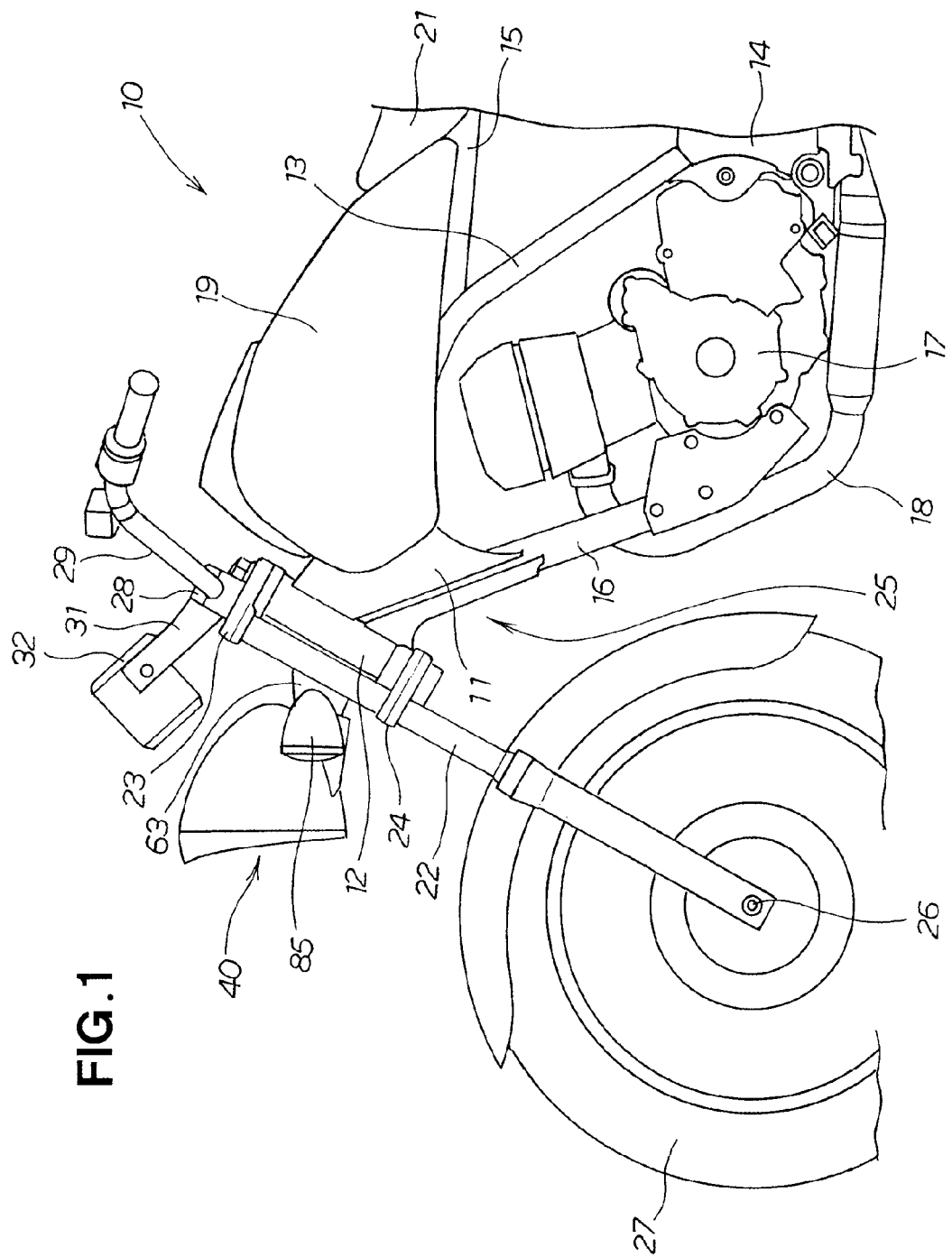
FIG. 1 is a side elevation view illustrating a front part of a two-wheeled motor vehicle.

As shown in FIG. 1, a two-wheeled motor vehicle or a motorcycle 10 is comprised of a skeletal framework or a body frame 11.

The body frame 11 includes a head pipe 12, a main frame 13 extending from the head pipe 12 rearwardly and then obliquely downwardly of the vehicle, a pivot plate 14 extending downwardly from a lower end of the main frame 13, a seat rail 15 extending in a branched fashion from a midpart of the main frame 13, and a down-tube 16 extending obliquely downward from the head pipe 12.

An engine 17 is supported by the down-tube 16 and the pivot plate 14. Extending from the engine 17 is an exhaust pipe 18. As clearly shown, the exhaust pipe 18 extends downward along the down-tube 16, below the engine 17 and then rearwardly of the vehicle.

A fuel tank 19 is placed on the main frame 13 while a seat 21 is placed on the seat rail 15.

Disposed forwardly of the head pipe 12 is a front fork 22 which mounted to the head pipe 12 via a top bridge 23 and a bottom bridge 24.

It should be construed that the body frame 11, the front fork 22, the top bridge 23, and the bottom bridge 24 jointly form a vehicle body 25.

Front wheel 27 is to a lower end of the front form 22 via an axle 26.

Steering handle 29 is secured to the top bridge 23 at the upper end of the front fork 22 via a handle holder 28. An operation of the steering handle 29 causes the front fork 22 to turn relative to the head pipe 12. By such a turn, the motorcycle 10 turns to the right or left.

From the top bridge 23, a meter stay 31 extends forwardly of the vehicle so as to support a meter 32 thereon.

Below the meter 32, there is provided a headlamp device 40 which is mounted to a front part of the vehicle body 25.

Figure 2:
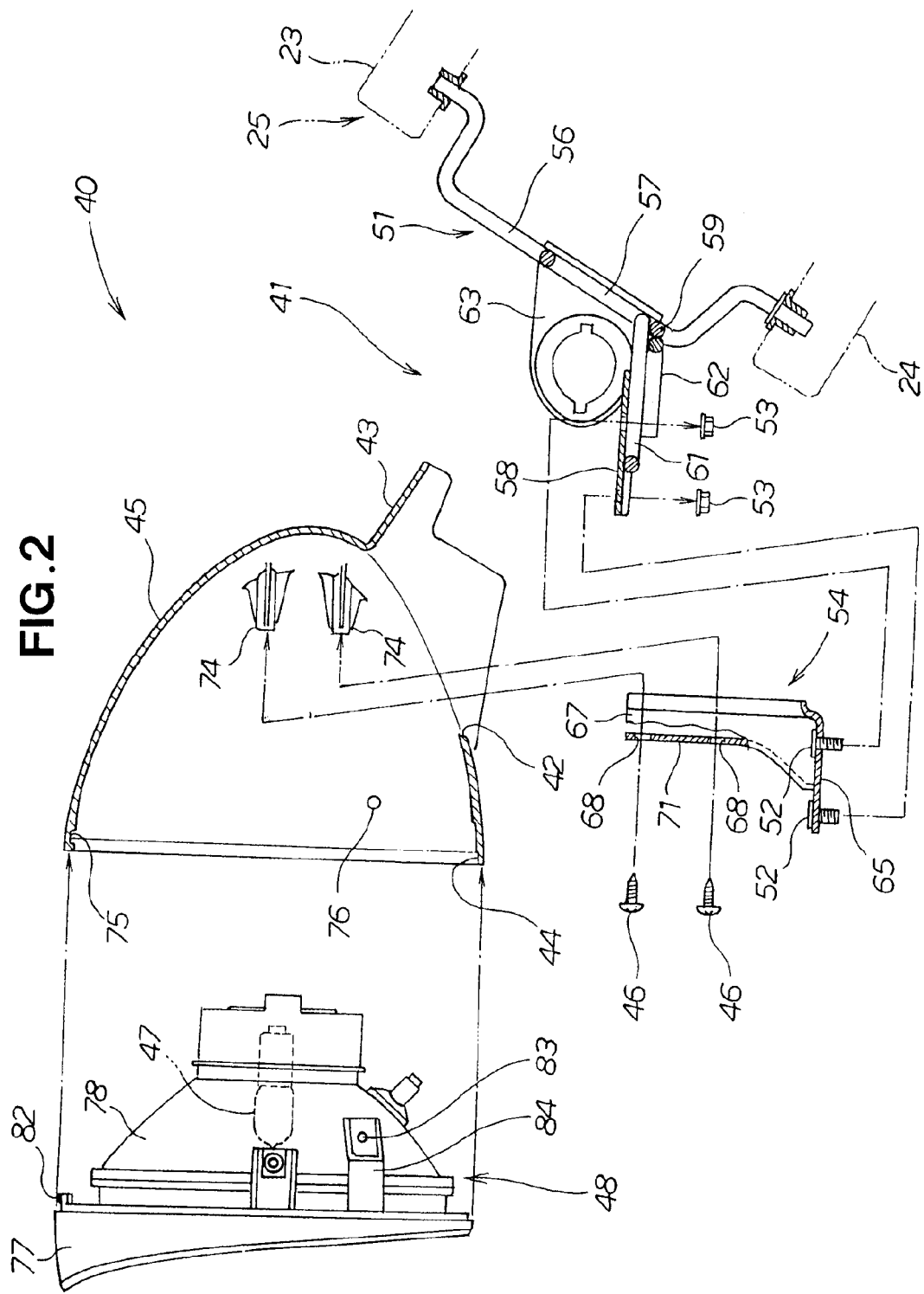
FIG. 2 is a is an exploded view illustrating a motorcycle headlamp device according to the present invention.

As shown in FIG. 2, the headlamp device 40 is comprised of a mounting stay 41, a headlamp case 45, connecting elements 46, and a lamp unit 48. The mounting stay 41 is adapted to be mounted to the vehicle body 25 by fitting a top part thereof into the top bridge 23 and fitting a bottom part into the bottom bridge 24.

The headlamp case 45 has at a lower part a hole 42 designed to allow insertion of the mounting stay 41, an extension 43 extending from the perimeter of the hole 42 obliquely rearwardly downwardly of the vehicle, and a front opening 44 formed at a front part thereof. The connecting elements 46 are provided for connecting the headlamp case 45 to the mounting stay 41. The lamp unit 48 is mounted to a front part of the headlamp case 45 in such a manner as to cover the front opening 44 and has a light emitting element 47.

The mounting stay 41 is comprised of a stay rear half member 51 designed to be attached to the vehicle body 25, and a stay front half member 54 designed to be coupled with the stay rear half member 51 by means of bolts 52 and nuts 53.

Figure 3:
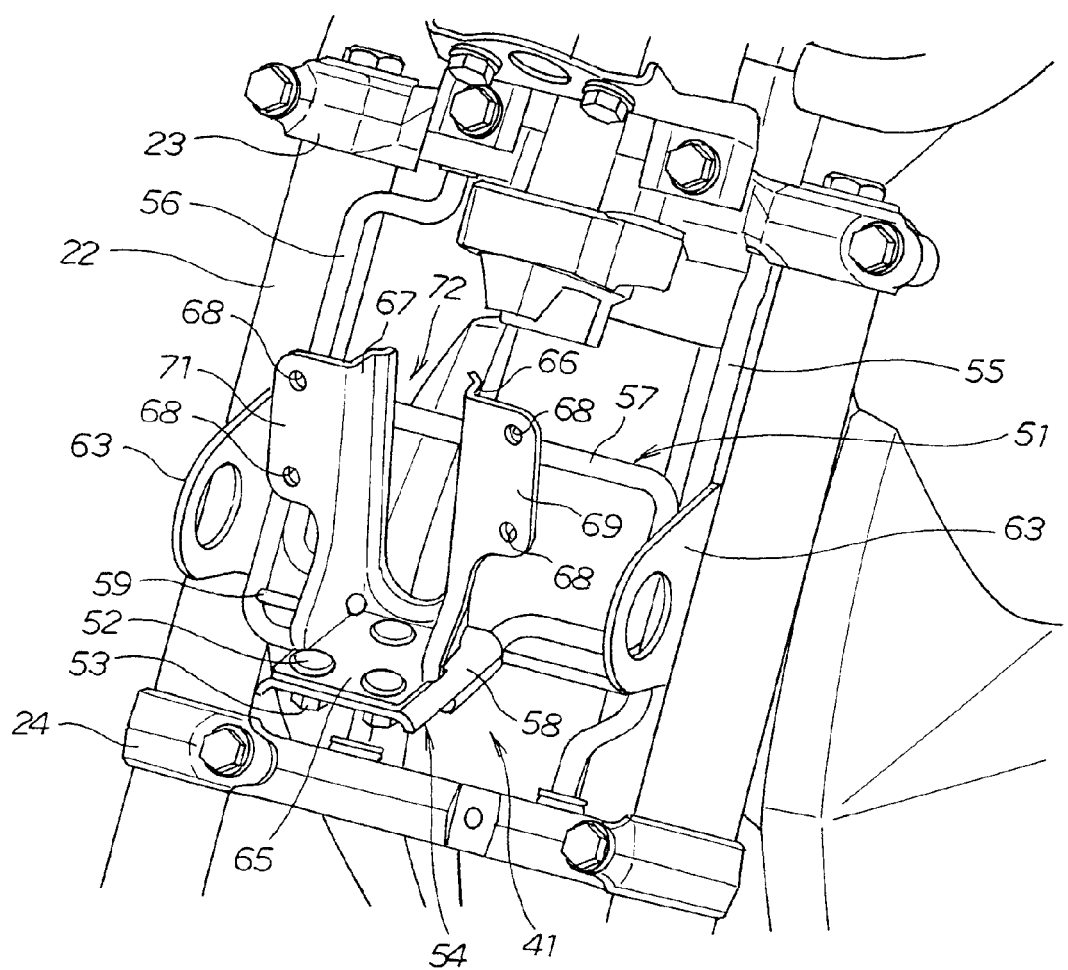
FIG. 3 is a perspective view showing a mounting stay.

Referring to FIG. 3, the stay rear half member 51 is comprised of left and right main rods 55, 56 extending vertically, a loop-shaped rod 57 weld-connected to the main rods 55, 56, a seat plate 58 weld-connected to a top end of the loop-shaped rod 57, a cross-rod 59 extending between the main rods 55, 56 in a vehicle widthwise direction, and a reinforcing rod 62, as shown in FIG. 2, weld-connected to the cross-rod 59, for supporting a protruding part 61 of the loop-shaped rod 57. Weld-connected to the main rods 55, 56 are plate-shaped direction indicator support parts 63, 63.

As shown in FIG. 3, the stay front half member 54 is comprised of a bottom part 65, a pair or left and right vertical wall parts 66, 67 extending upwardly from left and right ends of the bottom part 65 in a lengthwise direction of the vehicle, a left flange part 69 extending from the left vertical wall part 66 transversely leftwardly of the vehicle and having a plurality of through-holes 68, 68, and a right flange part 71 extending from the right vertical wall part 67 transversely rightwardly of the vehicle and having a plurality of through-holes 68, 68.

The stay front half member 54 is produced by press-bending a single metallic sheet. A gap 72, U-shaped as viewed from a front side of the vehicle, is defined by the left and right vertical wall parts 66, 67.

The bottom part 65 is secured to the seat plate 58 via bolts 52 and nuts 53 to thereby couple the stay front half member 54 unitarily with the stay rear half member 51.

Referring again to FIG. 2, the headlamp case 45 is in the form of a bowl and has pillar-shaped parts 74, 74 at a bottom of the bowl.

The stay front half member 54 of the mounting stay 41 is inserted into the hole 42 until the pillar-shaped parts 74 of the headlamp case 45 are brought into abutment against the stay front part member 54. Connecting elements 46, 46 such as screws are then inserted through the front opening 44 of larger diameter. The connecting elements 46, 46 are then passed through the through-holes 68, 68 and brought into contact with the pillar-shaped parts 74. Thereafter, the fastening elements 46, 46 are turned by means of a fastening tool such as a screw driver passed through the front opening 44 to thereby complete attachment of the headlamp case 45 to the mounting stay 41.

The headlamp case 45 has a groove 75 formed provided at an upper part of the front opening 44 and a screw hole 76 at a lower part of the opening 44.

The lamp unit 48 is comprised of a lens supporting ring 77, a reflector 78 connected to the lens supporting ring 77, and the light emitting element 47 disposed centrally of the reflector 78. The light emitting element 47 may be a light bulb or a light emitting diode.

Figure 4:
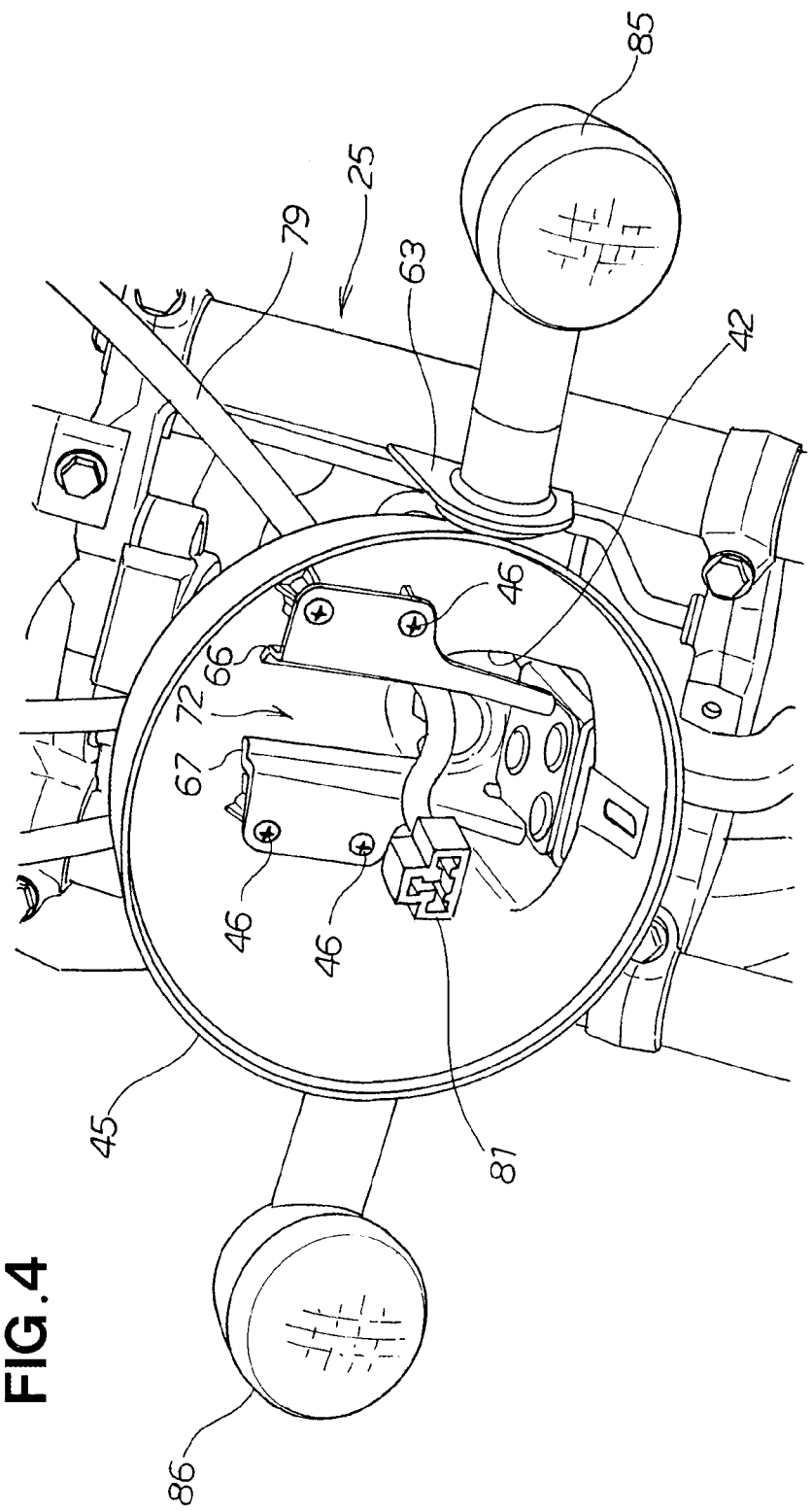
FIG. 4 is a perspective view illustrating the headlamp device with a lamp unit removed.

For feeding electrical energy to the light emitting element 47, a harness 79 is provided to extend from the vehicle body 25, as shown in FIG. 4. The harness 79 extends through the hole 42 into the headlamp case 45. The harness 79 is held between a pair of left and right vertical wall parts 66, 67. Attached to a distal end of the harness 79 is a connector 81 which is adapted to be brought into fitting engagement with the light emitting element 47 (FIG. 2).

As shown in FIG. 2, the lamp unit 48 is fitted into the front opening 44 with a claw 82 at an upper part of the lens supporting ring 77 placed in hooking engagement with the groove 75. Then, a stay part 84 extending from the lens supporting ring 77 and having a hole 83 is laid over the screw hole 76 such that the two holes 83, 76 are aligned. A screw of a predetermined size is passed through the two holes 83, 76 to thereby fix the lamp unit 48 to the headlamp case 45.

Figure 5:
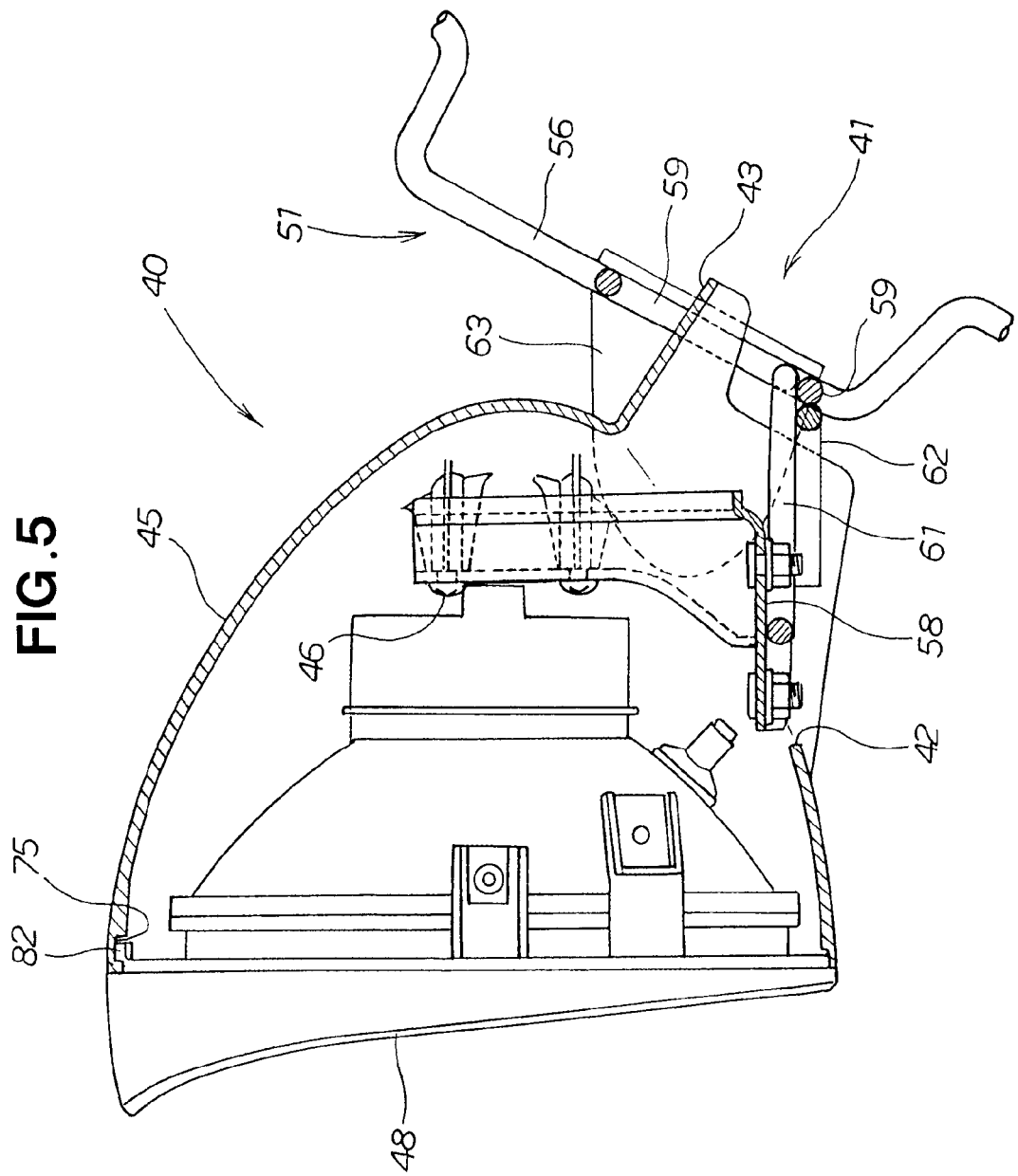
FIG. 5 is a cross-sectional view illustrating the headlamp device.

As shown in FIG. 5, the headlamp case 45 is attached to the mounting stay 41. The lamp unit 48 is attached to the headlamp case 45. An operation to attach the headlamp device to the vehicle body is now completed.

Thereafter, a left directing indicator 85 is attached to the direction indicator supporting part 63. A right direction indicator 86 is then attached in a similar manner.

Next, an operation and advantages of the inventive arrangement will be discussed.

As shown in FIG. 5, the headlamp case 45 is a non-divided part and hence is free of concerns about an increase in parts. The non-divided headlamp case 45 is less complex in construction than a divided-type headlamp case An operation to mount the headlamp device 40 to the vehicle body is completed by only two steps, namely, the step of attaching the headlamp case 45 to the mounting stay 41 and the step of attaching the lamp unit 48 to the headlamp case 45.

The headlamp case 45 has at the lower part the hole 42, as described in relation to FIG. 2. A foreign object entered into the headlamp device 45 may be discharged through the hole. Notwithstanding this, the hole 42 may be provided at an upper part of the headlamp case 45.

As discussed with reference to FIG. 3, the mounting stay 41 has the left and right vertical wall parts 66, 67, which are spaced laterally of the vehicle body, and the through-holes 68, 68, formed at the flanges 69, 71 extending from the vertical wall parts 66, 67, for allowing passage of connecting elements. By the vertical wall parts 66, 67 spaced laterally of the vehicle body, the gap 72 is formed. The mounting stay 41 becomes lighter by the amount corresponding to the gap 72. In other words, light-weighing of the mounting stay 41 is achieved.

The left vertical wall part 66 and the right vertical wall part 67 are spaced from each other so as to provide a space or the gap 72 for accommodating the harness for feeding electrical power to the light emitting element, as shown in FIG. 4. The gap 72 formed between the left and right vertical wall parts 66, 67 is utilized as a passage of the harness 79. Swinging of the harness 79 in the vehicle widthwise direction can be prevented by the left and right vertical wall parts 66, 67.

As described above in relation to FIG. 2, the headlamp case 45 is in the form of a bowl. By virtue of being bowl-shaped, it becomes possible for the headlamp case 45 to have the large-diameter front opening 44. By virtue of being bowl-shaped, the headlamp case 45 has an excellent external appearance. Notwithstanding this, the headlamp case 45 may have a tubular shape.

As also described above with reference to FIG. 2, the mounting stay 41 is comprised of the stay front half member 54, having the vertical wall parts, and the stay rear half member 51 for connecting the stay front half member 54 to the front part of the vehicle body 25. Plural kinds of the stay front half member and plural kinds of the stay rear half member may be prepared so that the combination of an arbitrarily selected kind of the stay front half member and an arbitrarily selected kind of the stay rear half member is made possible. The mounting stay is thus made capable of being applied to plural kinds of the headlamp device. Where such a combination is unnecessary, the stay front half member 54 and the stay rear half member 51 may be unified.

The stay rear half member 51 has the direction indicator supporting parts 63, 63 for supporting the direction indicators 85, 86. Dedicated direction indicator stay may thus be omitted.

Industrial Applicability

The present invention is useful for two-wheeled motor vehicles.

What is claimed is:

1. A headlamp device for a two-wheeled motor vehicle, comprising:

a mounting stay attached to a front part of a body of the two-wheeled motor vehicle and extending forward from the front part of the vehicle body;
a non-divided headlamp case having a hole for allowing insertion of the mounting stay, and a front opening formed at a front part thereof;
a connecting element for connecting the headlamp case to the mounting stay; and
a lamp unit mounted to a front part of the headlamp case in such a manner as to cover the front opening and having a light emitting element,
wherein the mounting stay has a front part inserted through the hole of the headlamp case into the headlamp case and secured to an interior part of the headlamp case by the connecting element, and
wherein the interior part of the headlamp case comprises a plurality of pillar-shaped parts disposed on an inner surface of the headlamp case, the connecting element comprising a plurality of fastening elements, and the front part of the mounting stay is in contact with the pillar-shaped parts and secured by the fastening elements to the pillar-shaped parts.

2. The headlamp device of claim 1, wherein the hole is formed at a lower part of the headlamp case.

3. The headlamp device of claim 1, wherein the front part of the mounting stay has a pair of left and right vertical wall parts spaced laterally of the vehicle body, and the vertical wall parts each having through-holes for allowing passage of the connecting elements element.

4. The headlamp device of claim 3, wherein the left and right wall parts are arranged such that a gap is formed therebetween wherein a harness is disposed for feeding electric power to the light emitting element.

5. The headlamp device of claim 3, wherein the mounting stay comprises a stay front half member having the vertical wall portions, and a stay rear half member connected to the stay front half member and connected to the front part of the vehicle body, the stay front half member forming the front part of the mounting stay.

6. The headlamp device of claim 1, wherein the headlamp device is in the form of a bowl.

7. The headlamp device of claim 5, wherein the stay rear half member has a direction indicator supporting part which supports a direction indicator.

8. The headlamp device of claim 5, wherein the stay rear half member and the stay front half member are connected together by a fastener.

9. The headlamp device of claim 5, wherein the stay front half member is formed from a single metallic sheet.

10. The headlamp device of claim 5, wherein the stay rear half member is connected to at least one of an upper bridge and a lower bridge of a frame of the vehicle body.

* * * * *